2,731,471

IMIDAZOLINE DERIVATIVES

Martin E. Synerholm, Leonard H. Jules, and Melville Sahyun, Santa Barbara, Calif., assignors to Melville Sahyun, doing business as Sahyun Laboratories, Santa Barbara, Calif.

No Drawing. Application May 21, 1954,
Serial No. 431,618

10 Claims. (Cl. 260—301)

The present invention relates to chemical compounds and is more particularly concerned with (a) 2-(hydrocarbon)-imidazolines having the formula:

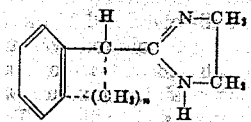

wherein $n$ is the integer two or three, and (b) acid addition and quaternary ammonium salts thereof.

This application is a continuation-in-part of our prior filed application Serial 361,819, filed June 15, 1953, now abandoned.

The compounds of the present invention have pharmacological properties which indicate that they are potent pressor materials with a relatively low toxicity, a high therapeutic index, and a relatively long period of therapeutic effect. The acid addition and quaternary ammonium salts are crystalline solids having high melting points and are soluble in water. The free imidazolines of the present invention are crystalline solids, soluble in ether and readily susceptible to salt formation. Additionally, the compounds are very stable, their solutions do not discolor, and they may be sterilized by heat.

Preparation of the compounds of the present invention may be readily accomplished by the condensation of ethylenediamine with the free hydrocarbon acids, either 1,2,3,4-tetrahydro-1-naphthoic acid or 1-indanecarboxylic acid, or lower-alkyl esters of these acids, such as, for example, the methyl ester, ethyl ester, propyl ester, isopropyl ester, butyl ester, pentyl ester, hexyl ester, et cetera. This reaction is usually conducted by heating the ethylenediamine to about its reflux temperature and adding appropriate acid or ester to the boiling liquid with subsequent heating at reflux for a suitable time. It is to be understood, however, that other temperatures may be used, with a consequent increase or decrease in reaction time, depending on the particular temperature and reacting components used. Equimolecular quantities of reactants are satisfactory, although an excess of the ethylenediamine is preferred. Upon completion of the reaction, the reaction mixture is cooled, and the substituted imidazoline separated in conventional manner.

A preferred procedure for preparing the compounds contemplates the condensation of the mono-para-toluene-sulfonate salt of ethylenediamine with 1,2,3,4-tetrahydro-1-naphthonitrile or 1-indanecarbonitrile. This reaction is conducted similar to the condensation described above, and the product separated in conventional manner.

Acid addition salts, such as, for example, the tartrate, nitrate, sulfate, hydrochloride, hydrobromide, hydriodide, acetate, et cetera, and quaternary ammonium salts such as, for example, the dimethylsulfate, ethyl bromide, methiodide, propyl chloride, et cetera, may be prepared by contacting an ethereal solution of the free imidazoline with the acid or quaternizing material and separating the resulting salt.

The following preparations are given to illustrate the preparation of intermediates useful in the preparation of the compounds of the present invention.

*Preparation 1.—1,2,3,4-tetrahydro-1-naphthonitrile*

Twenty-eight (28.0) grams (0.16 mole) of 1,2,3,4-tetrahydro-1-naphthoamide, fifty milliliters of thionyl chloride and fifty milliliters of benzene were heated together under reflux for six hours. After removing a small amount of solid material by filtration, the solvent and excess thionyl chloride were removed by distillation under a reduced pressure of about seven millimeters of mercury absolute. There was thus obtained 19.5 grams (77.5 percent of the theoretical yield) of 1,2,3,4-tetrahydro-1-naphthonitrile, boiling at 135–137 degrees centigrade at seven millimeters of mercury pressure absolute.
*Analysis.*—Calculated for $C_{11}H_{11}N$: N, 8.91. Found: 8.69.

*Preparation 2.—Methyl 1,2,3,4-tetrahydro-1-naphthoate*

A mixture of 14.3 grams (0.081 mole) of 1,2,3,4-tetrahydro-1-naphthoic acid and 100 milliliters of methanol saturated with hydrogen chloride was heated under reflux for six hours. The excess methanol and hydrogen chloride were removed by warming under reduced pressure. The residue was taken up in benzene, shaken with aqueous sodium bicarbonate, dried over anhydrous magnesium sulfate, filtered and distilled. The yield of ester boiling at 142–150 degrees centigrade at nineteen millimeters of mercury pressure was 13.4 grams (86.6 percent of the theoretical yield).

In a manner similar to that of the above Preparation 2, other esters of 1,2,3,4-tetrahydro-1-naphthoic acid may be prepared by substituting an appropriate alcohol for the methyl alcohol. Also, esters of 1-indanecarboxylic acid can be prepared in a similar manner.

The following examples are given to illustrate methods for synthesizing the compounds of the present invention, but are not to be construed as limiting.

*Example 1.—2-(1,2,3,4-tetrahydro-1-naphthyl)imidazoline hydrochloride*

A 100-milliliter flask, fitted with a dropping funnel and a short Vigreux column bearing a distilling head, was charged with 25 grams (0.419 mole) of ethylenediamine and 4.5 grams of ethylenediamine hydrochloride. The mixture was heated with a free flame at the reflux temperature of the mixture while ten grams (0.052 mole) of methyl 1,2,3,4-tetrahydro-1-naphthoate was added dropwise thereto. The temperature of the mixture was raised gradually over a period of about one hour to 240 degrees centigrade, while the excess of ethylenediamine distilled from the mixture. The temperature was held at 240 degrees centigrade for ten minutes, the mixture cooled, poured into fifty milliliters of water and made acidic with dilute hydrochloric acid. A small amount of solid (bisamide) was separated by filtration. The filtrate was extracted once with ether, treated with charcoal, filtered and made strongly alkaline. The oil, 2-(1,2,3,4-tetrahydro-1-naphthyl)-imidazoline, was extracted with ether. The ethereal extract was dried over anhydrous magnesium sulfate, filtered and acidified with ethereal hydrogen chloride. The white, crystalline solid, 2-(1,2,3,4-tetrahydro-1-naphthyl)-imidazoline hydrochloride, after recrystallization from alcohol, melted at 256–257 degrees centigrade; yield 3.4 grams (27.8 percent of the theoretical yield).

*Analysis.*—Calculated for $C_{13}H_{17}N_2Cl$: N, 11.84; Cl, 14.98. Found: 11.81; 14.77.

In a manner similar to that of the above example other acid addition salts, such as, for example, the phosphate, phthalate, sulfate, tartrate, nitrate, lactate, formate, citrate, et cetera, may be prepared by contacting an ethereal solution of 2-(1,2,3,4-tetrahydro-1-naphthyl)-imidazoline with an ethereal solution of an appropriate acid and recovering the salt thus-formed. Also, quaternary ammonium salts may be prepared in a similar manner by contacting an ethereal solution of an appropriate quaternizing compound, such as, for example, methyl iodide, ethyl iodide, propyl chloride, butyl bromide, dimethyl sulfate, et cetera, with an ethereal solution of 2-(1,2,3,4-tetrahydro-1-naphthyl)-imidazoline and recovering the quaternary ammonium salt thus-formed.

Pursuant to the procedure of the above example, the following salts were prepared from the free 2-(1,2,3,4-tetrahydro-1-naphthyl)-imidazoline:

| Name | M. P., °C. | Recrystallization Solvent | Analysis | | |
|---|---|---|---|---|---|
| | | | | Cal'd | Found |
| Dihydrogen phosphate | 209–10 | Ethanol | N | 9.39 | 9.29 |
| Hydrobromide | 250–2 | do | N | 9.95 | 9.82 |
| Cyclohexylsulfamate | 125–7 | Isopropanol | N | 11.27 | 11.09 |
| Bitartrate | 160–1 | Ethanol | N | 8.00 | 7.77 |
| Saccharinate | 83–8 | Isopropanol | N | 10.96 | 10.37 |
| Methyl iodide | 183–4.5 | Alcohol | N | 35.62 | 35.82 |

Example 2

A mixture of five grams (0.0318 mole) of 1,2,3,4-tetrahydro-1-naphthonitrile and sixteen grams (0.064 mole) of ethylenediamine mono-para-toluenesulfonate [prepared according to the procedure recited in Journal of the Chemical Society (1947), page 297] was heated at 200 to 210 degrees centigrade for two hours with occasional swirling. After cooling, the reaction mixture was dissolved in fifty milliliters of dilute hydrochloric acid, and extracted with two 25-milliliter portions of ether to remove neutral material. The aqueous layer was made strongly alkaline, and the solid material separated by filtration, washed with water and dried. After recrystallization from heptane-alcohol, there was obtained 4.9 grams (77 percent of the theoretical yield) of 2-(1,2,3,4-tetrahydro-1-naphthyl)-imidazoline, melting at 117–119 degrees centigrade.

*Analysis.*—Calculated for $C_{13}H_{16}N_2$: N, 13.98. Found: 13.77.

Example 3.—2-(1-indanyl)-imidazoline hydrochloride

A mixture of ten grams, (0.062 mole) of 1-indane-carboxylic acid and fifty grams of the mono-para-toluenesulfonate salt of ethylenediamine were heated together at 270–280 degrees centigrade for approximately 45 minutes. The mixture was cooled, dissolved in dilute hydrochloric acid, extracted once with ether, and the aqueous phase made strongly alkaline with sodium hydroxide. Extraction of this alkaline mixture with ether, drying of the ether extracts and acidification with ethereal hydrogen chloride yielded 8.5 grams of a crude brown powder. After recrystallization from alcohol, there was obtained five grams of 2-(1-indanyl)imidazoline hydrochloride, melting at 244–245 degrees centigrade.

*Analysis.*—Calculated for $C_{12}H_{14}N_2HCl$: Cl, 15.92. Found: 15.86.

In a manner similar to that of the foregoing Example 3, other acid addition salts of the indanyl compound may be prepared, than the hydrochloride, as by contact of various acids instead of hydrogen chloride with the alkaline aqueous solution. Among these acid addition salts which may be prepared, include, for example, the tartrate, nitrate, citrate, phosphate, sulfate, et cetera, as well as quaternary ammonium salts, such as, for example, the methyl iodide, methyl bromide, propyl chloride, dimethyl sulfate, et cetera.

Example 4.—2-(1,2,3,4-tetrahydro-1-naphthyl) imidazoline hydrochloride

A mixture of 540 grams (9.0 moles) of ethylenediamine, 270 grams (1.53 mole) of 1,2,3,4-tetrahydro-alpha-naphthoic acid, and 360 milliliters (4.32 moles) of concentrated hydrochloric acid was introduced into a two-liter, three-necked flask fitted with a thermometer, stirrer, and distillation take-off. The mixture was distilled under a pressure of about twenty millimeters of mercury absolute until the temperature rose to 210 degrees centigrade. Thereafter, heating was continued under atmospheric pressure and when the temperature reached about 260 degrees centigrade, an exothermic reaction was initiated. The heat was then adjusted to maintain a reaction temperature of 275–280 degrees centigrade for 45 minutes and the mixture thereafter cooled to room temperature. Nine hundred milliliters of 4 Normal hydrochloric acid was added and the aqueous layer stirred with warming until a clear, brown solution resulted. This brown solution was made strongly alkaline with sodium hydroxide. The oil that separated solidified and was collected on a filter leaving filtrate A. The solid was dissolved in 370 milliliters of alcohol with warming, and the solution was treated with 130 milliliters of concentrated hydrochloric acid with stirring and cooling. This acidified mixture was diluted with 300 milliliters of ether and chilled. The solid salt was collected and dried and the filtrate concentrated to approximately 300 milliliters, diluted with 300 milliliters of ether and the salt which separated collected and dried. Filtrate A was extracted with ether, dried, acidified with alcoholic hydrogen chloride, and the salt which separated was collected and dried. There was thus obtained, when all the salt had been combined, 250 grams (69.3 percent of the theoretical yield) of 2-(1,2,3,4-tetrahydro-1-naphthyl)imidazoline hydrochloride, melting at 256–257 degrees centigrade.

Various modifications may be made in the present invention without departing from the spirit or scope thereof, and it is to be understood that we limit ourselves only as defined in the appended claims.

We claim:

1. A compound selected from the group consisting of (a) those compounds having the formula:

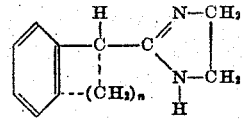

wherein $n$ is an integer from two to three inclusive, and (b) stable, non-toxic acid addition and quaternary ammonium salts thereof.

2. 2-(1,2,3,4-tetrahydro-1-naphthyl)imidazoline hydrochloride.

3. 2-(1,2,3,4-tetrahydro-1-naphthyl)imidazoline.

4. 2-(indanyl)imidazoline hydrochloride.

5. 2-(1,2,3,4-tetrahydro-1-naphthyl)imidazoline dihydrogen phosphate.

6. 2-(1,2,3,4-tetrahydro-1-naphthyl)imidazoline hydrobromide.

7. 2-(1,2,3,4-tetrahydro-1-naphthyl)imidazoline cyclohexylsulfamate.

8. 2-(1,2,3,4-tetrahydro-1-naphthyl)imidazoline bitartrate.

9. 2-(1,2,3,4-tetrahydro-1-naphthyl)imidazoline saccharinate.

10. 2 - (1,2,3,4 - tetrahydro - 1 - naphthyl)imidazoline methyl iodide.

References Cited in the file of this patent

UNITED STATES PATENTS

| | | |
|---|---|---|
| 2,161,938 | Sonn | June 13, 1939 |
| 2,215,864 | Waldmann et al. | Sept. 24, 1940 |
| 2,441,069 | Hoffman et al. | May 4, 1948 |